United States Patent Office 3,551,428
Patented Dec. 29, 1970

3,551,428
NEW 1- (or 2-) SUBSTITUTED 4-MERCAPTO-PYRAZOLO[3,4-d]PYRIMIDINES
Jean Druey, Riehen, and Paul Schmidt, Therwil, Switzerland, assignors to Ciba Corporation, New York, N.Y., a corporation of Delaware
No Drawing. Division of application Ser. No. 292,783, July 3, 1963, now Patent No. 3,399,196, which is a continuation-in-part of application Ser. No. 815,826, May 26, 1959, which is a continuation-in-part of application Ser. No. 775,334, Nov. 21, 1958, which is a continuation-in-part of application Ser. No. 667,042, June 20, 1957, now Patent No. 2,980,677; application Ser. No. 292,783 is a continuation-in-part of application Ser. No. 815,824, May 26, 1959, now Patent No. 3,187,006, which is a continuation-in-part of application Ser. No. 775,356, Nov. 21, 1958, which in turn is a continuation-in-part of application Ser. No. 637,895, Feb. 4, 1957. This application June 27, 1967, Ser. No. 649,118
Claims priority, application Switzerland, Feb. 10, 1956, 29,762/56
Int. Cl. C07d 57/16
U.S. Cl. 260—256.5
10 Claims

ABSTRACT OF THE DISCLOSURE

Compounds of the formulae

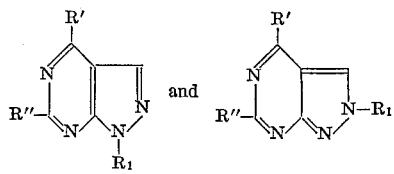

in which $R_1$ stands for branched alkyl, alkenyl or cycloalkyl having at least 3 carbon atoms or hydroxyalkyl, $R'$ stands for free or substituted amino, hydrazino, halogen or free or etherified mercapto, and $R''$ stands for hydrogen, alkyl or for $R'$ for example: the 2-isopropyl-4-mercapto-pyrazolo[3,4-d]pyrimidine.

Use: Coronary dilatating, diuretic, analgetic or antibacterial agents.

CROSS-REFERENCES TO OTHER APPLICATIONS

This is a divisional application of our copending application Ser. No. 292,783, filed July 3, 1963, now U.S. Pat. No. 3,399,196, which is a continuation-in-part application of our application Ser. No. 815,826, filed May 26, 1959, now abandoned, which itself is a continuation-in-part application of our application Ser. No. 775,334, filed Nov. 21, 1958, now abandoned, which itself is a continuation-in-part application of our application Ser. No. 667,-042, filed June 20, 1957, now U.S. Pat. No. 2,980,677; application Ser. No. 292,783 is also a continuation-in-part application of our application Ser. No. 815,824, filed May 26, 1959, now U.S. Pat. No. 3,187,006, which itself is a continuation-in-part application of our application Ser. No. 775,356, filed Nov. 21, 1958, now abandoned, which itself is a continuation-in-part application of our application Ser. No. 637,895, filed Feb. 4, 1957, now abandoned.

SUMMARY OF THE INVENTION

This invention relates to new N-substituted pyrazolo-[3,4-d]pyrimidines. More particularly, it concerns 1-$R_1$-4-$R'$-6-$R''$ - pyrazolo[3,4-d]pyrimidines and 2 - $R_1$-4-$R'$-6-$R''$-pyrazolo[3,4-d]pyrimidines, in which $R_1$ stands for a lower radical of aliphatic character having at least 3 carbon atoms, $R'$ stands for a halogen atom, such as chlorine or bromine, or an etherified hydroxyl group or a free or substituted amino or mercapto group, and $R''$ has the same meanings as $R'$ or stands for hydrogen or a lower alkyl radical, and salts of these compounds. Preferred are compounds of the above kind, which are unsubstituted in 3-position and wherein $R_1$ has the above meaning, $R'$ is a free amino group or a hydrazino group or a substituted amino group, and $R''$ is hydrogen, lower alkyl or has the same meanings as $R'$.

Radicals of aliphatic character are in the first place aliphatic or cycloaliphatic hydrocarbon radicals, such as lower branched alkyl radicals or lower alkenyl or cycloalkyl radicals, such as radicals having at least 3 carbon atoms, or hydroxy-lower alkyl radicals, such as isopropyl, sec.-butyl, pentyl-(2), pentyl-(3), isopentyl, cyclopentyl, cyclohexyl, cycloheptyl, hydroxy-ethyl, hydroxy-propyl and the like.

Etherified hydroxyl groups are more especially aliphatically etherified hydroxyl groups, particularly lower alkoxy groups. The substituted mercapto groups are also preferably lower aliphatically substituted and are primarily lower alkyl-mercapto groups.

The substituents that may be present in the amino group are preferably saturated hydrocarbon radicals which may contain heteroatoms, such as oxygen, nitrogen or sulfur, in the carbon chain. Such radicals are e.g. lower alkyl, preferably with at most 6 carbon atoms, lower oxaalkyl, lower azaalkyl, lower alkylene, lower oxaalkylene, lower azaalkylene, N'-lower alkyl-azaalkylene, lower cycloalkyl, or lower oxacycloalkyl-lower alkyl. The substituted amino groups $R'$ and $R''$ may therefore advantageously be lower alkyleneimino, lower mono-oxa-alkyleneimino, lower mono-aza-alkyleneimino, N'-lower alkyl-lower mono-aza-alkyleneimino, wherein the hetero atoms are separated from the iminonitrogen by a chain of 2–3 carbon atoms, or substituted amino wherein the substituents are lower alkyl, lower alkoxyalkyl, lower dialkylaminoalkyl, lower alkyl-aminoalkyl, lower monocyclic cycloalkyl or tetrahydrofurfuryl.

Preferred are lower alkylamino such as monoalkylamino or dialkylamino groups, pyrrolidino, piperidino, morpholino, piperazino or N-lower alkyl-piperazino groups. Lower alkyl groups that may be present in the amino groups are, more especially, methyl, ethyl, propyl, isopropyl, butyl, isobutyl and pentyl groups. The substituted amino groups may also be a hydrazino group.

The new compounds may bear further substituents. They may contain in the 3-position, for example, a hydrocarbon radical, such as an alkyl or aryl radical.

The new compounds possess valuable pharmacological properties, above all they possess a coronary dilatating action. They also have an effect on the central nervous system and varying diuretic, analgesic, antirheumatic and antivirus action. Furthermore, they have, as far as the halogen compounds are concerned, antibacterial and antimycotic properties, e.g. against Staph. aureus and Trichophyton interdig. They are, therefore, useful as medicaments or disinfectants. The halogen and mercapto compounds are furthermore valuable intermediates in that the halogen atoms or the free or etherified mercapto groups may be exchanged for amino groups.

Especially valuable as regards their coronary dilating, diuretic and analgesic effect are 4-amino-pyrazolo[3,4-d] pyrimidines of the formulae

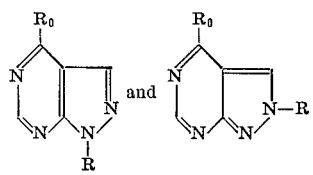

in which R represents a saturated hydrocarbon radical with 3–6 carbon atoms, preferably a branched alkyl, such as branched propyl, butyl or pentyl group and $R_0$ is a lower mono- or dialylamino group wherein the alkyl radicals have at most 6 carbon atoms each, such as the mono- or dimethylamino, mono- or diethylamino, mono- or dipropylamino or mono- or dibutylamino group, and more particularly the coronary dilatating compounds 1-isopropyl - 4-diethylamino-pyrazolo[3,4-d]pyrimidino-2-isopropyl - 4 - mercapto-pyrazolo[3,4-d]pyrimidine, and 2-isopropyl - 4 - mercapto-pyrazolo[3,4-d]pyrimidine, and 2-isopropyl - 4 -amino - pyrazolo[3,4-d]pyrimidine, and the diuertic and analgetic compound 1-isopropyl-4-n-propylamino - pyrazolo[3,4-d]pyrimidine. Also valuable are the corresponding halogeno, mercapto or etherified mercapto compounds serving as intermediates for the preparation of the amino compounds.

Compounds of the above formula, wherein $R_0$ stands for a piperazino group, such as the piperazino or N-methyl-piperazino group have a stimulating effect on the central nervous system similar to that of cardiazol; thus they stimulate respiration.

The new compounds are obtained by methods known per se. Thus 1-$R_1$- or 2-$R_1$-3-amino-pyrazole-4-carboxylic acids can be reacted with carboxylic acids in the form of their functional derivatives or of the free acids, provided that in the reactants at least one of the two carboxyl groups contains an amino group suitable for ring closure and in resulting 4- and/or 6-hydroxy-pyrazolo[3,4-d] pyrimidines with free hydroxyl groups the latter are exchanged for halogen atoms, etherified hydroxyl groups or free or substituted amino or mercapto groups, and/or if desired, halogen atoms are exchanged for etherified hydroxyl groups or free or substituted mercapto or amino groups, and/or, if desired, free mercapto groups are substituted, and/or if desired, free or etherified mercapto groups are replaced by amino groups.

For the reaction with aminopyrazoles there are used primarily functional derivatives of formic acid, for example formamide; or of carbonic acid, such as urea, thiourea, guanidine, halogen-carbonic acid esters, carbonic acid dihalides, for example phosgene, cyanates, for example alkali cyanates, thiocyanates; or lower fatty acids in the form of their anhydrides, esters or halides. In the case of carboxylic acid derivatives free from nitrogen there are used pyrazolo-4-carboxylic acids in the form of their acid derivatives containing an amino group, such as the amide. In such reactions open chain intermediate products can first be formed, such as for example pyrazolyl-(3)-isocyanates. The latter can also be formed from potential 3-amino-pyrazoles, for instance from 3-carbamyl-pyrazoles by Hoffmann's degradation.

The condensation of the aminopyrazoles to the pyrazolo-pyrimidines is carried out preferably at a temperature above 100° C. if desired in the presence of a diluent and/or condensing agent, under atmospheric or superatmospheric pressure.

In the compounds obtained free hydroxyl groups are exchanged for halogen atoms, such as chlorine or bromine, by ordinary halogenation, for example with phosphoric acid halides, such as phosphorus oxychloride or phosphorus pentachloride; or converted into mercapto groups by treatment with a sulfurizing agent, such as phosphorus pentasulfide. Halogen atoms can be exchanged for etherified hydroxyl groups or free or substituted amino or mercapto groups in the usual manner, for example by reaction with an alcoholate, thiourea, metal salt of hydrogen sulfide or a mercaptan, or with ammonia or an amine.

Free mercapto groups can be substituted by treatment with reactive esters of the corresponding alcohols. As reactive esters there may be mentioned those of strong inorganic or organic acids, for example, hydrohalic acids, sulfuric acid or organic sulfonic acids, for example, arylsulfonic acids. Finally, free or substituted mercapto groups can be exchanged for amino groups by treatment with ammonia or an amine.

In the above processes it is of advantage to use as starting materials those which lead to the formation of the pyrazolo-pyrimidines mentioned above as being especially valuable.

The 2-$R_1$-3-amino-pyrazole - 4 - carboxylic acid esters, amides or nitriles used are obtained, for example, by reacting an α-cyano-α-formyl-acetic acid ester, amide or nitrile or functional derivative thereof, such as an enolether with a hydrazine of the formula $R_1$-NH-$NH_2$. As functional derivatives of the α-cyano-α-formyl-acetic acid ester, amide or nitrile there are advantageously used enolethers of a α-cyano-α-formyl-acetic acid esters, amides or nitriles, such as alkoxy-methylene-cyanoacetic acid derivatives, for example, ethoxy-methylene-cyanoacetic acid methyl ester or ethoxy-methylene-cyanoacetic acid amide or nitrile. The condensation to form the pyrazoles takes place under mild conditions. However, it is of advantage to work at a higher temperature, if desired, in the presence of a condensing agent, for example, in the presence of an acid.

Advantageously, the reaction components are reacted in the presence of a diluent, such as an alcohol, toluene or chloroform. In the resulting 3-amino-pyrazoles, a nitrile group may be hydrolyzed to the amide group.

The corresponding 1-$R_1$-3-amino-pyrazole-4-carboxylic acid esters, amides or nitriles are obtained by reacting the above-described α-cyano-α-formyl or α-acyl-acetic acid derivatives with hydrozines, which contain at one nitrogen the substituent $R_1$ and on the other a radical capable of being split off by hydrolysis, subjecting the resulting compounds to hydrolysis and ring closure. The radical which can be split off by hydrolysis is preferably an acyl, such as the acetyl radical, or an arylidene radical, such as the benzylidene radical. The condensation is preferably carried out at an elevated temperature and in a diluent, such as ethanol, benzene or toluene or chloroform. The hydrolysis is advantageously carried out with aqueous or alcoholic hydrochloric acid, whereby ring closure is also effected.

These reactions are carried out according to our copending application Ser. No. 815,824 (now U. S. Pat. No. 3,187,006), filed on even date with copending application Ser. No. 815,826 (now abandoned).

The other starting materials, insofar as they are new, can be made by methods in themselves known.

The new compounds having a basic character form salts with inorganic or organic acids. As salt-forming acids there may be mentioned in the first place those suitable for the formation of therapeutically acceptable salts, for example, hydrohalic acids, sulfuric acid, phosphoric acid, nitric acid, perchloric acid; aliphatic, alicyclic, aromatic or heterocyclic carboxylic or sulfonic acids, such as formic acid, acetic acid, propionic acid, oxalic acid, succinic acid, glycollic acid, lactic acid, malic acid, tartaric acid, citric acid, ascorbic acid, hydroxymaleic acid, di-hydroxymaleic acid or pyroracemic acid; phenylacetic acid, benzoic acid, para-amino-benzoic acid, anthranilic acid, para-hydroxybenzoic acid or salicylic or para-aminosalicylic acid; methane-sulfonic acid, ethane-sulfonic acid, hydroxyethane-sulfonic acid, ethylene-sulfonic acid; toluene sulfonic acid, naphthalene sulfonic acids or sulfanilic acid.

The new pyrazolo-pyrimidines described above, and their therapeutically useful and non-toxic salts and mixtures thereof can be used in the form, for example, of pharmaceutical preparations. These preparations contain the active substance in admixture with a pharmaceutical organic or inorganic carrier suitable for enteral, parenteral or topical administration. As the carriers there are used substances which do not react with the active compounds, for example, water, gelatine, lactose, white petroleum jelly, starches, magnesium stearate, talc, vegetable oils, benzyl alcohols, gums, polyalkylene glycols, cholesterol or other known carrier for medicaments. The pharmaceutical preparations may be made up, for example, in the form of tablets, dragees or in liquid form as solutions, suspensions or emulsions. If desired, they may be sterilized and/or may contain auxiliary substances, such as preserving, stabilizing, wetting or emulsifying agents. They may also contain other therapeutically valuable substances. The preparations are made up by the usual methods. Preferably they contain the active compound in an amount of from 50 to 500 mg. per dosage unit. The exact total daily dose to be administered depends upon the specific condition of the patient.

The following examples illustrate the invention:

EXAMPLE 1

15 grams of 1-cyclohexyl - 4 - chloropyrazolo[3,4-d]pyrimidine and 50 cc. of diethylamine are heated together in a closed vessel for 5 hours at 90–100° C. The reaction product is rinsed out with 100 cc. of benzene and the insoluble constituents are filtered off with suction. 2 N-caustic soda solution is added to the filtrate and then the mixture is extracted with ether. By removing the ether from the ethereal extract by evaporation there is obtained as residue 1 - cyclo-hexyl - 4 - diethylamino-pyrazolo[3,4-d]pyrimidine of the formula

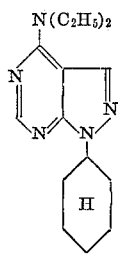

which melts at 75–77° C. After recrystallization once from petroleum ether the melting point rises to 78–79° C.

The 1-cyclohexyl - 4 - chloro-pyrazolo[3,4-d] pyrimidine used as starting material is obtained as follows:

A solution of 2.3 grams of sodium in 40 cc. of absolute ethanol is added to a solution ow 15.05 grams of cyclo-hexylhydrazine hydrochloride in 50 cc. of absolute ethanol. 16.9 grams of ethoxy-methylene-cyanoacetic acid ethyl ester, dissolved in 20 cc. of ethanol are added to the reaction solution, and the whole is heated for 10 hours at the boil. After cooling the mixture, the precipitated sodium chloride is filtered off with suction, and the filtrate is evaporated to dryness. The crystalline residue is triturated with water and filtered with suction. There is obtained 2 - cyclohexyl-3-amino-4-carbethoxy-pyrazole melting at 112–114° C. After being recrystallized from petroleum ether the melting point of the product rises to 115–116° C.

20 grams of 2-cyclohexyl - 3 - amino-4-carbethoxy-pyrazole are heated with 50 grams of formamide for 6 hours in a bath having a temperature of 200–210° C. After cooling the mixture, 1 - cyclohexyl - 4 - hydroxy-pyrazolo[3,4-d]pyrimidine crystallizes out. It melts at 245–246° C.

21.8 grams of 1 - cyclohexyl - 4 - hydroxy-pyrazolo[3,4-d]pyrimidine are heated with 100 cc. of phosphorus oxychloride for 8 hours at the boil. The phosphorus oxychloride is evaporated off, the residue is introduced into ice-water, the pH value is adjusted to 10 with a 2 N-solution of caustic soda, and the whole is extracted with ether. The residue obtained after evaporating the ether is recrystallized from petroleum ether. There is obtained 1-cyclohexyl - 4 - chloropyrazolo[3,4-d]pyrimidine in the form of white crystals melting at 67–68° C.

EXAMPLE 2

7 grams of 1-(secondary-butyl) - 4 - chloro-pyrazolo[3,4-d]pyrimidine are heated in 50 cc. of diethylamine for 5 hours at 90–100° C. The reaction product is rinsed out with 100 cc. of benzene and the precipitate is filtered off. A 2 N-solution of caustic soda is added to the filtrate, the mixture is extracted with ether, and the ether residue is distilled in a high vacuum. 1-(secondary-butyl)-4-diethylamino-pyrazolo[3,4-d]pyrimidine of the formula

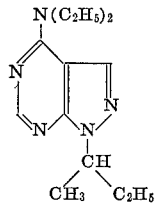

distills under 0.08 mm. pressure at 116–118° C. The monohydrochloride, obtained in the usual manner, melts at 162.5–163.5° C.

The 1 - (secondary-butyl) - 4-chloro-pyrazolo[3,4-d]pyrimidine used as starting material is prepared as follows:

16.9 grams of ethoxy-methylene-cyanoacetic acid ethyl ester and 8.8 grams of secondary-butyl-hydrazine are heated in 100 cc. of absolute ethanol for 10 hours at the boil. The mixture is then evaporated in vacuo, and the residue is distilled in vacuo. 2-(secondary-butyl)-3-amino-4-carbethoxy-pyrazole boils under 0.09 mm. pressure at 105–107° C.

10.5 grams of 2 - (secondary-butyl) - 3-amino-4-carbethoxy-pyrazole are heated with 25 cc. of formamide for 6 hours at 200–210° C. The reaction solution is cooled to 0° C. and there is obtained crystalline 1-(secondary-butyl) - 4-hydroxy-pyrazolo[3,4-d]pyrimidine melting at 174–175° C.

9.6 grams of 1-(secondary-butyl)-4-hydroxy-pyrazolo[3,4-d]pyrimidine are boiled under reflux with 50 cc. of phosphorus oxychloride for 8 hours. The phosphorus oxychloride is then evaporated off, the residue is introduced into ice-water, the pH value is adjusted to 10 with a 2 N-solution of caustic soda, the mixture is extracted with ether, and the residue obtained after evaporating the ether is distilled in vacuo. I-(secondary-butyl)-4-chloro-pyrazolo[3,4-dipyrimidine boils at 137–138° C. under 10 mm. pressure.

EXAMPLE 3

15 grams of 1-[3'-methyl-butyl-(2')]-4-chloropyrazolo[3,4-d]pyrimidine and 50 cc. of diethylamine are heated together in a closed vessel for 6 hours at 90–100° C. Ether is added to the reaction product, the insoluble portion is filtered with suction and the ethereal filtrate is washed with 2 N-sodium hydroxide solution. The ether residue is distilled at 149–151° C. under 0.2 mm. pressure. 1-[3' - methyl-butyl-(2')]-4-diethylamino-pyrazolo[3,4-d]pyrimidine of the formula

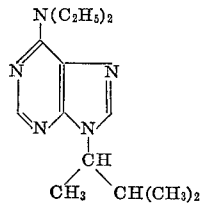

is obtained as a yellowish oil. The hydrochloride obtained in the ordinary manner melts at 184–185° C.

The 1 - [3'-methyl-butyl-(2')]-4-chloro-pyrazolo[3,4-d]pyrimidine used as starting material is obtained as follows:

86 grams of methyl-isopropyl ketone are added to a solution of 50 grams of hydrazine hydrate in 500 cc. of 2 N-hydrochloric acid with stirring and ice-cooling. Hydrogenation is then carried out at room temperature and 19 atmosphere gauge pressure with 2 grams of platinum oxide as catalyst. Within an hour 22.4 liters of hydrogen are taken up, which corresponds to one mol of $H_2$. The catalyst is filtered off with suction, the reaction mixture is evaporated to dryness under reduced pressure and 500 cc. of concentrated sodium hydroxide solution are added to the residue, 3-hydrazino-2-methyl-butane separating in the form of oil. For the purpose of purification the oil separated in the separating funnel is distilled. 3-hydrazino-2-methyl-butane passes over at 39–44° C. under 11 mm. of pressure.

21 grams of 3-hydrazino-2-methyl-butane are added to a solution of 24.4 grams of ethoxy-methylene-malonic acid-dinitrile in 250 cc. of ethanol. The reaction mixture is heated under reflux for 12 hours, allowed to cool and the precipitate filtered with suction. After recrystallization from ethanol there is obtained 2-[3'-methyl-butyl-(2)]-3-amino-4-cyano-pyrazole in the form of white crystals melting at 167–168° C.

200 cc. of 2 N-sodium hydroxide solution and 100 cc. of alcohol are added to 18 grams of 2-[3'-methylbutyl-(2')]-3-amino-4-cyano-pyrazole and the solution heated at the boil for 3 hours. The alcohol is evaporated under reduced pressure, the reaction mixture allowed to cool and the precipitate suction-filtered. The latter is recrystallized from alcohol and there is obtained 2-[3'-methyl-butyl(2')] - 3-amino-4-carbamyl-pyrazole in the form of white crystals melting at 227–228° C.

10 grams of 2 - [3'-methyl-butyl-(2')]-3-amino-4-carbamyl-pyrazole are heated with 30 grams of formamide for 5 hours in a bath at 200–210° C. After cooling, 1-[3' - methyl-butyl - (2')] - 4 - hydroxy-pyrazolo[3,4-d]pyrimidine crystallizes; the product melts at 190–192° C.

20 grams of 1-[3'-methyl-butyl-(2')]-4-hydroxy-pyrazolo[3,4-d]pyrimidine are heated with 100 cc. of phosphorus oxychloride for 12 hours at the boil. The phosphorus oxychloride is evaporated under reduced pressure, the residue is poured into ice-water, and the mixture is adjusted to a pH value of 10 with 2 N-sodium hydroxide solution and extracted with ether. The ether residue is recrystallized from petroleum ether. There is obtained 1-[3' - methyl-butyl-(2')] - 4-chloro-pyrazolo[3,4-d]pyrimidine in the form of white crystals melting at 45–46° C.

EXAMPLE 4

11.4 grams of 1-secondary butyl-4-chloropyrazolo[3,4-d]pyrimidine are heated in 250 cc. of 8 N-alcoholic ammonia for 5 hours at 140–150° C. in a closed tube. After cooling, the reaction solution is evaporated to dryness, water is added to the residue and the mixture extracted with methylene chloride. After evaporating the methylene chloride solution, there is obtained as residue 1-secondary butyl-4-amino-pyrazolo[3,4-d]pyrimidine melting at 128–130° C. After being recrystallized once from ether the melting point is 131–132° C.

For the preparation of the hydrochloride 3.86 grams of the above base are dissolved in 15 cc. of absolute alcohol, 7.46 cc. of 2.7 N-alcoholic hydrochloric acid are added and the mixture is then evaporated to a volume of about 10 cc. On adding ether the monohydrochloride crystallizes and melts at 163–164° C.

The above described base can also be easily obtained in the following way: 20 grams of 2-secondary butyl-3-amino-4-cyano-pyrazole are heated with 60 cc. of formamide at 200–220° C. for 8 hours under nitrogen. After cooling, water is added to the reaction solution, the mixture is extracted with ample methylene chloride and the methylene chloride solution evaporated. The residue is recrystallized from ether. There is obtained the above described 1-secondary butyl-4-amino-pyrazolo[3,4-d]pyrimidine melting at 130–131° C.

The 2-secondary butyl-3-amino-4-cyanopyrazole used as starting material is prepared as follows:

288 grams of ethyl-methyl ketone are added to a solution of 200 grams of hydrazine hydrate in 572 cc. of 7 N-hydrochloric acid with stirring and ice-cooling. Hydrogenation is then carried out at room temperature and under 100 atmosphere gauge pressure with 2 grams of platinum oxide as catalyst. Within 45 minutes the quantity calculated for 4 mols of hydrogen, 89.6 liters, is taken up. The catalyst is suction-filtered, the filtrate is adjusted to pH 4 with 2 N-hydrochloric acid and the solution is evaporated under reduced pressure until crystallization sets in. 500 cc. of concentrated sodium hydroxide solution are then added with ice-cooling. Solid sodium hydroxide is then added until the secondary butyl hydrazine separates in the form of an oil. The oil is decanted, dried over sodium hydroxide and distilled. Secondary butyl hydrazine passes over between 102 and 109° C.

122 grams of ethoxymethylene malonic acid dinitrile are dissolved in 800 cc. of ethyl alcohol and a solution of 88 grams of secondary butyl hydrazine in 200 cc. of ethyl alcohol is added. The whole is heated at the boil for 10 hours. The ethyl alcohol is then evaporated under reduced pressure, a solid product precipitating. The latter is recrystallized from ethyl alcohol and 2-secondary butyl-3-amino-4-cyano-pyrazole obtained in the form of crystals melting at 147–148° C.

EXAMPLE 5

8 grams of 1-secondary butyl-4-methyl-mercapto-pyrazolo[3,4-d]pyrimidine are boiled under reflux for 4 hours with 7 cc. of hydrazine hydrate in 36 cc. of absolute alcohol. The reaction solution is then evaporated under reduced pressure, water is added to the crystalline residue and the mixture is extracted with chloroform. From the evaporated chloroform solution there is obtained as residue 1-secondary butyl-4-hydrazino-pyrazolo[3,4-d]pyrimidine which, after recrystallization from ether, melts at 126–127° C.

The 1-secondary butyl-4-methyl-mercapto-pyrazolo[3,4-d]pyrimidine used as starting material can be obtained as follows:

19.2 grams of 1-secondary butyl-4-hydroxy-pyrazolo[3,4-d]pyrimidine are boiled under reflux for 5 hours in 110 cc. of pyridine with 26.7 grams of phosphorus pentasulfide. The still hot reaction solution is poured into 800 cc. of 1 N-hydrochloric acid and the pH of the solution adjusted to 3–4 by the addition, if necessary, of hydrochloric acid. The mixture is allowed to stand for about 12 hours and the precipitated crystals are then suction-filtered. 400 cc. of 1 N-sodium hydroxide solution are added, the insoluble portion filtered off. 5 N-hydrochloric acid is added to the clear filtrate until the pH value is 2-3, whereupon 1-secondary butyl-4-mercapto-pyrazolo[3,4-d]pyrimidine melting at 152–153° C. separate.

6.1 cc. of dimethyl sulfate are added dropwise in the course of three minutes to 10.4 grams of 1-secondary butyl-4-mercapto-pyrazolo[3,4-d]pyrimidine in 60 cc. of 1 N-sodium hydroxide solution and the whole is stirred for 1 hour, two layers forming in the reaction solution. The solution is then agitated for 2 hours with 300 cc. of chloroform. After evaporating the chloroform solution, the residue is distilled in high vacuum and there is obtained 1-secondary butyl-4-methylmercapto-pyrazolo[3,4-d]pyrimidine boiling at 102–105° C. under 0.2 mm. of pressure.

EXAMPLE 6

166 cc. of a 4 N-alcoholic ethylamine solution are added to 15 grams of 1-secondary butyl-4-chloro-pyrazolo[3,4-d]pyrimidine in 50 cc. of absolute alcohol and the whole is heated for 5 hours at 90–100° C. in a sealed tube. The reaction solution is then evaporated under reduced pressure. Water is added to the solid residue and the mixture is extracted with methylene chloride. From the evaporated methylene chloride solution there is obtained 1-secondary butyl-4-ethylamino-pyrazolo[3,4 - d]pyrimidine melting at 106–107° C.

For the preparation of the hydrochloride 3.29 grams of the above described base are dissolved in 25 cc. of absolute alcohol, and 5.55 cc. of 2.7 N-alcoholic hydrochloric acid are added. After evaporating the solution under reduced pressure, ether is added and the monohydrochloride of 1-secondary butyl-4-ethylamino-pyrazolo[3,4-d]pyrimidine melting at 142–143° C. crystallizes out.

EXAMPLE 7

13.2 grams of 1-secondary butyl-4-chloro-pyrazolo[3,4-d]pyrimidine are heated at 90–100° C. for 5 hours in a sealed tube with 130 cc. of a 7 N-alcoholic dimethylamine solution. The reaction solution is then evaporated under reduced pressure, water is added to the solid residue and the mixture is extracted with methylene chloride. From the evaporated methylene chloride solution there is obtained as residue 1-secondary butyl-4-dimethylamino-pyrazolo[3,4-d]pyrimidine melting at 86–87° C.

For the preparation of the hydrochloride 4.38 grams of the above base are dissolved in 25 cc. of alcohol, 7.4 cc. of 2.7 N-alcoholic hydrochloric acid are added and the whole is extensively evaporated under reduced pressure. On the addition of ether, the hydrochloride of 1-secondary butyl - 4 - dimethylamino - pyrazolo[3,4-d]pyrimidine of melting point 228–229° C. crystallizes.

The above described base can also be prepared as follows:

8.6 grams of 1-secondary butyl-4-methyl-mercapto-pyrazolo[3,4-d]pyrimidine are heated at 100° C. for 6 hours in a sealed tube with 130 cc. of dimethyl-amine. After evaporating the reaction solution, water is added to the residue and the mixture is extracted with chloroform. From the evaporated chloroform solution there is obtained as residue the above described 1-secondary butyl-4-dimethylamino - pyrazolo[3,4-b]pyrimidine melting at 86–87° C.

EXAMPLE 8

10.5 grams of 1-secondary butyl-4-chloro-pyrazolo[3,4-d]pyrimidine are heated with a solution of 29.5 grams of isopropylamine in 130 cc. of alcohol at 95–100° C. for 5 hours in a sealed tube. After evaporating the reaction solution, water is added to the residue and the mixture is extracted with methylene chloride. From the evaporated methylene chloride solution there is obtained 1-secondary butyl-4-isopropylamino-pyrazolo [3,4-d]pyrimidine melting at 119.5–121° C.

For the preparation of the hydrochloride 4.66 grams of the above described base are dissolved in 25 cc. of absolute alcohol, 7.4 cc. of 2.7 N-alcoholic hydrochloric acid are added and the whole is evaporated under reduced pressure. On the addition of ether, the monohydrochloride of 1-secondary butyl-4-isopropylamino-pyrazolo [3,4-d]pyrimidine melting at 181–182° C. crystallizes out.

EXAMPLE 9

10.5 grams of 1-secondary butyl-4-chloro-pyrazolo[3,4-d]pyrimidine are heated with a solution of 29.5 grams of n-propylamine in 130 cc. of alcohol at 95–100° C. for 5 hours in a closed tube. After evaporating the reaction solution, water is added to the residue and the mixture extracted with methylene chloride. The methylene chloride residue, is distilled in a high vacuum, 1-secondary butyl-4-n-propylamino-pyrazolo[3,4-d]pyrimidine distills under 0.08 mm. pressure at 151–152° C., melting at 70–71° C.

For the preparation of the hydrochloride 4.68 grams of the above base are dissolved in absolute alcohol and 7.4 grams of 2.7 N-alcoholic hydrochloride acid are added, and the whole is extensively evaporated under reduced pressure. On the addition of ether the hydrochloride of 1-secondary butyl-4-n-propylamino-pyrazolo [3,4-d]pyrimidine melting at 148–150° C. crystallizes out.

EXAMPLE 10

7 grams of 1-pentyl-(3')-4-chloro-pyrazolo[3,4-d]pyrimidine are heated with 50 cc. of diethylamino for 5 hours at 90–100° C. in a closed tube. The reaction solution is diluted with benzene and the insoluble material filtered off. The filtrate is mixed with dilute sodium hydroxide solution and extracted with ether. After evaporating the organic solvent, the oil remaining behind is distilled in high vacuum. There is obtained 1-pentyl-(3')-4-diethylamino-pyrazolo[3,4-b]pyrimidine of the formula

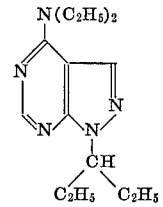

boiling at 118–120° C. under 0.15 mm. of pressure.

For the preparation of the hydrochloride 5.9 grams of the above base are dissolved in alcohol, 3.95 cc. of 5.7 N-alcoholic hydrochloric acid are added and the whole is evaporated under reduced pressure. On adding ether, the hydrochloride of 1-pentyl-(3')-4-diethylamino-pyrazolo[3,4-d]pyrimidine melting at 167–168° C. crystallizes out.

The 1-pentyl-(3')-4-chloro-pyrazolo[3,4-d]pyrimidine used as starting material is obtained as follows:

344 grams of diethyl ketone are added to a solution of 200 grams of hydrazine hydrate in 528 cc. of 7.57 N-hydrochloric acid with stirring and ice-cooling. After adding 270 cc. of ethanol the whole is stirred for 30 minutes. Hydrogenation is carried out at room temperature and under 130 atmospheres gauge pressure with 2 grams of platinum oxide as catalyst. With 15 minutes the quantity of hydrogen calculated for 4 mols, 89.6 liters, is taken up. The catalyst is suction-filtered, the filtrate is adjusted to pH 4 with 2 N-hydrochloric acid and the solution is concentrated under reduced pressure until crystallization sets in. 500 cc. of concentrated sodium hydroxide solution are added with ice-cooling. Solid sodium hydroxide is added until isopentyl-hydrazine separates as an oil. The oil is decanted off, dried over sodium hydroxide and distilled. Pentyl-3-hydrazine passes over between 46–50° under 11 mm. of pressure.

84.5 grams of ethoxymethylene cyanacetic acid ethyl ester and 51 grams of pentyl-3-hydrazine are heated to the boil in 500 cc. of absolute alcohol for 10 hours. The whole is evaporated under reduced pressure and the residue distilled in vacuo. 2-pentyl-(3')-3-amino-4-carbethoxy-pyrazole boils at 175° C. under 11 mm. of pressure.

22.5 grams of 2-pentyl-(3')-3-amino-4-carbethoxy-pyrazole are heated in 50 cc. of formamide at 200–210° C. for 10 hours. After cooling, the reaction product is extracted with methylene chloride. The methylene chloride solution is washed twice with water and then evaporated. The resulting residue is dissolved in 2 N-sodium hydroxide solution. By acidifying with 2 N-hydrochloric acid there is obtained 1-pentyl-(3')-4-hydroxy-pyrazolo[3,4-d]pyramidine melting at 140–141° C. On recrystallization from a mixture of ether and petroleum ether the melting point is raised to 142–143° C.

10.3 grams of 1-pentyl-(3') - 4 - hydroxy - pyrazolo [3,4-d]pyrimidine are boiled under reflux with 50 cc. of phosphorus oxychloride for 8 hours. The phosphorus oxychloride is evaporated, the residue is put into ice water, the pH value is adjusted to 10 with 2 N-sodium hydroxide solution, the reaction product is extracted with ether and the ether residue distilled in vacuo. 1-pentyl-(3')-4-chloro-pyrazolo[3,4 - d]pyrimidine boils at 139–140° C. under 11 mm. of pressure.

EXAMPLE 11

10 grams of 1-pentyl-(3')-4-chloropyrazole[3,4-d] pyrimidine are heated at 90–100° C. for 5 hours in a sealed tube with a solution of 29.5 grams of N-propylamine in 130 cc. of absolute alcohol. After evaporating the reaction solution, water is added to the residue and the reaction product is extracted with methylene chloride. The residue obtained from the methylene chloride solution is distilled. 1-pentyl-(3')-4 - n - propylaminopyrazole[3,4-d]pyrimidine boils at 137° C. under 0.15 mm. of pressure.

For the preparation of the hydrochloride 6.62 grams of the above base are dissolved in 40 cc. of alcohol, 4.68 cc. of 5.7 N-alcoholic hydrochloric acid are added, and the whole is slightly evaporated under reduced pressure. On the addition of ether, the hydrochloride of 1-pentyl-(3')-4-n - propylamino-pyrazolo[3,4-d]pyrimidine melting at 118–121° C. crystallizes from the solution. The compound is very hygroscopic.

EXAMPLE 12

20 grams of 2-pentyl-(3')-3-amino-4-cyanopyrazole are heated in 60 cc. of formamide at 200–220° C. for 8 hours. After cooling, water is added to the reaction product, the latter is extracted with methylene chloride and the residue from the evaporated methylene chloride solution is recrystallized from a mixture of ether and petroleum ether. There is obtained 1-pentyl-(3')-4-amino-pyrazolo[3,4-d]pyrimidine melting at 146–147° C.

For the preparation of the hydrochloride 6.15 grams of the above base are dissolved in 20 cc. of absolute alcohol, 5.96 cc. of 50.5 N-alcoholic hydrochloric acid are added and the whole is evaporated under reduced pressure. On the addition of ether the hydrochloride of 1-pentyl-(3')-4 - amino-pyrazolo[3,4-d]pyrimidine melting at 167–169° C. crystallizes from the solution.

The 2-pentyl-(3')-3-amino-4-cyano-pyrazole used as starting material is prepared as follows:

12.2 grams of ethoxymethylene-malonic acid dinitrile are dissolved in 200 cc. of ethyl alcohol and 10.1 grams of pentyl-(3')-hydrazine are added. The mixture is heated at the boil for 12 hours. The ethyl alcohol is then evaporated in vacuo, a solid product precipitating. The latter is recrystallized from ethyl alcohol, and 2-pentyl-(3')-3-amino-4-cyano-pyrazole is obtained in the form of crystals melting at 140–141° C.

EXAMPLE 13

10 grams of 1-cyclopentyl-4-chloro-pyrazolo[3,4-d]pyrimidine are heated at 90–100° C. for 5 hours in 70 cc. of diethylamine in a closed tube. After cooling, the reaction solution is diluted with benzene and the precipitated crystals are suction-filtered. 2 N-sodium hydroxide solution is added to the filtrate and the reaction product is extracted with ether. After evaporating the organic solvent, the remaining oil is distilled in high vacuum. 1-cyclopentyl-4-diethylamino - pyrazolo[3,4-d]pyrimidine of the formula

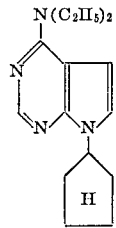

boils at 136–138° C. under 0.05 mm. of pressure.

For the preparation of the hydrochloride 7.65 grams of the above base are dissolved in 30 cc. of absolute alcohol and 7.17 cc. of 4.1 N-alcoholic hydrochloric acid are added and the whole is evaporated in vacuo. On the addition of ether the hydrochloride of 1-cyclopentyl-4 - diethylamine - pyrazolo[3,4-d]pyrimidine melting at 177–179° C. crystallizes from the solution.

The 1-cyclopentyl-4-chloro-pyrazolo[3,4-d]pyrimidine used as starting material is obtained as follows:

336 grams of cyclopentanone are added to a solution of 200 grams of hydrazine hydrate in 572 cc. of 7 N-hydrochloric acid with stirring and ice-cooling. Hydrogenation is carried out at room temperature under 100 atmospheres gauge pressure with 2 grams of platinum oxide as catalyst. Within an hour the quantity of hydrogen calculated for 4 mols, 89.6 liters, is taken up. The catalyst is filtered off with suction, the filtrate is adjusted to pH 4 with 2 N-hydrochloric acid and the solution evaporated in vacuo until crystallization sets in. 500 cc. of concentrated sodium hydroxide solution are then added with ice-cooling. Solid sodium hydroxide are then added until cyclopentyl hydrazine separates as an oil. The latter distills at 60–65° C. under 11 mm. of pressure.

67.6 grams of ethoxymethylene cyanacetic acid ethyl ester and 40 grams of cyclopentyl hydrazine are boiled under reflux in 400 cc. of absolute alcohol for 10 hours. The solution is evaporated in vacuo and the residue distilled in high vacuum. 2-cyclopentyl-3-amino-4-carbethoxy-pyrazole boils at 152° C. under 0.15 mm. of pressure. The melting point of the compound is 64–66° C.

22.3 grams of 2-cyclopentyl-3-amino-4-carbethoxy-pyrazole are heated in 50 cc. of formamide at 200–210° C. for 10 hours. After cooling, the precipitated crystals are suction-filtered, dissolved in 1 N-sodium hydroxide solution, filtered and the filtrate acidified with 2 N-hydrochloric acid to pH 4, whereby 1-cyclopentyl-4-hydroxy-pyrazolo[3,4-d]pyrimidine melting at 225–226° C. separates.

20.6 grams of 1-cyclopentyl-4-hydroxy-pyrazolo[3,4-d]pyrimidine are heated at the boil for 8 hours with 100 cc. of phosphorus oxychloride. The phosphorus oxychloride is evaporated off, the residue is put into ice-water, adjusted to pH 10 with 2 N-sodium hydroxide solution and extracted with ether. From the evaporated ether solution there is obtained as residue 1-cyclopentyl-4-chloro-pyrazolo[3,4-d]pyrimidine melting at 51–52° C.

EXAMPLE 14

9 grams of 1-cyclopentyl-4-chloro-pyrazolo[3,4-d]pyrimidine are heated at 90–100° C. for 5 hours in a sealed tube with 32.8 grams of n-propylamine dissolved in 130 cc. of absolute alcohol. After evaporating the reaction solution, water is added to the residue and the reaction product is extracted with methylene chloride. From the evaporated methylene chloride solution there is obtained as residue 1-cyclopentyl-4-n-propylamino-pyrazolo[3,4-d]pyrimidine melting at 91-92° C.

For the preparation of the hydrochloride 7.82 grams of the above base are dissolved in 30 cc. of absolute alcohol, and 7.75 cc. of 4.12 N-alcoholic hydrochloric acid are added. On the addition of ether the hydrochloride of 1-cyclopentyl-4-n - propylamino - pyrazolo[3,4-d]pyrimidine melting at 196–198° C. crystallizes from the solution.

EXAMPLE 15

11.83 grams of 1-cyclohexyl-4-chloro-pyrazolo[3,4-d]pyrimidine are heated at 140–150° C. for 5 hours in a closed tube with 120 cc. of 8 N-alcoholic ammonia solution. After evaporating the reaction solution, water is added to the residue and the reaction product is extracted with methylene chloride. From the evaporated methylene chloride solution there is obtained as residue 1-cyclohexyl-4-amino-pyrazolo[3,4-d]pyrimidine melting at 188–189° C.

For the preparation of the hydrochloride 3.25 grams of the above base are dissolved in 25 cc. of absolute alcohol, 5.5 cc. of 2.7 N-alcoholic hydrochloric acid are added and the mixture is then extensively evaporated. On the addition of ether, the hydrochloride of 1-cyclohexyl-4-amino-pyrazolo[3,4-d]pyrimidine melting at 236-238° C. crystallizes out.

The above described base can be prepared as follows:
40 grams of 2-cyclohexyl-3-amino-4-cyano-pyrazole are heated at 200–210° C. for 8 hours with 120 cc. of formamide. After cooling, water is added to the reaction product and it is then extracted with methylene chloride. To the residue obtained from the methylene chloride solution there is added 0.75 N-hydrochloric acid, any undissolved material is filtered off and the filtrate is adjusted to pH 7 with 2 N-sodium hydroxide solution; 1-cyclohexyl-4-amino-pyrazolo[3,4-d]pyrimidine melting at 186–187° C. separates.

The 2-cyclohexyl-3-amino-4-cyano-pyrazole used as starting material can be prepared as follows:

392 grams of cyclohexanone are added to a solution of 200 grams of hydrazine hydrate in 572 cc. of 7 N-hydrochloric acid with stirring and ice-cooling. Hydrogenation is then carried out at room temperature and under 100 atmospheres gauge pressure with 2 grams of platinum oxide as catalyst. Within 30 minutes the quantity of hydrogen calculated for 4 mols, 89.6 liters, is taken up. 1000 cc. of ethyl alcohol are added in order to dissolve the precipitated crystals. The catalyst is then filtered off with suction, the filtrate is adjusted to pH 4 and evaporated in vacuo until crystallization sets in. After cooling, the precipitated crystals are filtered and the filtrate mixed with 500 cc. of concentrated sodium hydroxide solution with ice-cooling. Solid sodium hydroxide is then added until cyclohexylhydrazine separates as an oil. The latter distills at 77–80° C. under 12 mm. of pressure. The resulting distillate is reacted immediately with alcoholic hydrochloric acid into the hydrochloride; melting point 112–113° C.

150.5 grams of cyclohexyl-hydrazine hydrochloride are dissolved in 500 cc. of ethyl alcohol and a solution of 23 grams of sodium in 400 cc. of ethyl alcohol is added with cooling. The reaction solution is then slowly added with stirring to an alcoholic solution of 122 grams of ethoxy methylene malonic acid dinitrile, the temperature rising to about 45° C. The mixture is then heated at the boil for 10 hours, allowed to cool and the precipitated sodium chloride filtered off. The filtrate is evaporated to dryness in vacuo. The residue is dissolved in 200 cc. of ethyl alcohol, filtered and the solution poured into 1400 cc. of water with stirring, 2-cyclohexyl-3-amino-4-cyanopyrazole which melts at 124–126° C. precipitating in the form of crystals.

EXAMPLE 16

8.8 grams of 1-cyclohexyl-4-chloro-pyrazolo[3,4-d] pyrimidine are heated at 90–100° C. for 5 hours in a closed tube with 110 cc. of 4 N-alcoholic ethylamine solution. After evaporating the reaction solution, water is added and extraction is carried out with methylene chloride. From the evaporated methylene chloride solution there is obtained as residue 1-cyclohexyl-4-ethylamino-pyrazolo[3,4-d]pyrimidine melting at 170–172° C. After recrystallization from benzene, the melting point is 172–172.5° C.

EXAMPLE 17

To a solution of 9 grams of 1-cyclohexyl-4:6-dichloro-pyrazolo[3,4-d]pyrimidine in 25 cc. of absolute benzene there are added 175 cc. of benzolic dimethylamine solution of 36% strength and the whole is heated at 90–100° C. for 6 hours in a closed tube. After cooling, the separated crystals are suction-filtered and the filtrate evaporated to dryness. The residue is taken up in petroleum ether. After filtering off a small quantity of insoluble matter, the product is concentrated and allowed to crystallize out. The resulting 1-cyclohexyl-4:6-bis-(dimethylamino)-pyrazolo[3,4-d]pyrimidine melts at 169–170° C.

The 1-cyclohexyl-4:6 dichloro-pyrazolo[3,4-d]pyrimidine used as starting material is prepared as follows:

57 grams of 2-cyclohexyl-3-amino-4-cyano-pyrazole are boiled under reflux for 2½ hours in 230 cc. of absolute alcohol and 230 cc. of 2 N-sodium hydroxide solution. After cooling, the crystals are suction-filtered. There is obtained 2-cyclohexyl-3-amino-pyrazole-4-carboxylic acid amide of the formula

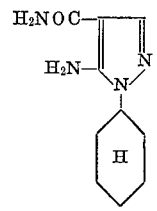

melting at 267–268° C.

30 grams of 2-cyclohexyl-3-amino-pyrazole-4-carboxylic acid amide are heated at 200° C. for 1½ hours with 60 grams of urea. After cooling, 1 N-sodium hydroxide solution is added to the reaction product, a small quantity of undissolved matter is filtered off, and the filtrate acidified with 5 N-hydrochloric acid, whereupon a precipitate separates. The latter is taken up in dimethyl-formamide, filtered and allowed to crystallize out. There is obtained 1-cyclohexyl-4:6 dihydroxy-pyrazolo[3,4-d]pyrimidine melting at 330° C. with decomposition.

15 grams of 1-cyclohexyl-4:6 dihydroxy-pyrazolo[3,4-d]pyrimidine are heated at 150° C. for 15 hours in a closed tube in 250 cc. of phosphorus oxychloride. After cooling, any undissolved matter is filtered off with suction and the filtrate is evaporated at 50–60° C. in vacuo. The resulting residue is poured into ice-water and extracted immediately with chloroform. After evaporating the chloroform solution, a mixture of ether and petroleum ether is added to the residue, then charcoal, the mixture is filtered and evaporated under reduced pressure. There is obtained as residue 1-cyclohexyl-4:6-dichloro-pyrazolo[3,4-d]pyrimidine melting at 82–83° C.

EXAMPLE 18

280 cc. if benzolic dimethylamine solution of 36% strength are added to a solution of 16 grams of 1-secondary butyl-4:6-dichloro-pyrazolo[3,4-d]pyrimidine in 25 cc. of benzene, and the whole is heated at 100° C. for 6 hours in a closed tube. After cooling, the separated crystals are filtered off and the filtrate evaporated. Ether is added to the residue, the solution is filtered and evaporated to a small volume, whereupon crystals separate on cooling, 1-secondary butyl-4:6-bis-(dimethylamino)-pyrazolo[3,4-d]pyrimidine is obtained in the form of white crystals melting at 113–114° C.

The 1-secondary butyl-4:6-dichloro-pyrazolo[3,4-d]pyrimidine used as starting material is prepared as follows:

75 grams of 2-secondary butyl-3-amino-4-cyano-pyrazole are boiled under reflux for 2½ hours in 750 cc. of absolute alcohol and 1500 cc. of 2 N-sodium hydroxide solution. The solution is then concentrated to a volume of about 1000 cc. in vacuo at a temperature of 50° C. and then cooled to 0° C. The separated crystals are filtered off. There is obtained 2-secondary butyl-3-amino-pyrazole-4-carboxylic acid amide melting at 198–199° C.

60 grams of 2-secondary butyl-3-amino-pyrazole-4-carboxylic acid amide are heated at 200° C. for 1½ hours with 120 grams of urea. After cooling, 2.5 N-sodium hydroxide solution is added to the reaction product, any undissolved material is filtered off and the filtrate acidified to a pH value of 3 with hydrochloric acid of 27% strength, whereupon crystals separate. The latter are dissolved in alcohol, the solution is filtered, the filtrate evaporated and water added, whereupon crystallization sets in. There is obtained 1-secondary 4:6-dihydroxy-pyrazolo[3,4-d]pyrimidine melting at 225–227° C.

24 grams of 1-secondary butyl-4:6-dihydroxy-pyrazolo [3,4-d]pyrimidine are heated at 150° for 15 hours in a closed tube in 350 cc. of phosphorus oxychloride. After cooling, any undissolved matter is filtered off and the filtrate evaporated at 60° C. in vacuo. The residue is poured into ice-water and extracted with chloroform. The residue from the evaporated chloroform solution is distilled. There is obtained 1-secondary butyl-4:6-dichloro-pyrazolo [3,4-d]pyrimidine in the form of a colorless oil boiling at 102° C. under 0.2 mm. of pressure.

EXAMPLE 19

20 grams of 2-cyclopentyl-3-amino-4-cyano-pyrazole (prepared by heating 48.8 g. of ethoxy-methylene-malonitrile and 40 g. of cyclopentyl-hydrazine in 400 cc. ethanol to the boil for 10 hours, concentrating the solution, dissolving the precipitate in ethanol and crystallizing by the addition of water, M.P. 113–114°) are heated at 200–210° for 8 hours in 60 cc. of formamide. After cooling, water is added and extraction carried out with methylene chloride. The residue from the methylene chloride solution is dissolved in 80 cc. of 1 N-hydrochloric acid, filtered with charcoal and the filtrate adjusted to pH 7 with 2 N-sodium hydroxide solution, whereupon crude 1-cyclopentyl - 4 - amino-pyrazolo[3,4-d]pyrimidine melting at 145–146° C. separates.

EXAMPLE 20

19.7 grams of 2-isopropyl-4-carbethoxy-3-amino-pyrazole are heated for 4 hours in a bath having a temperature of 200–210° C. with 50 grams of formamide. After cooling, the reaction mixture is taken up in 2 N-caustic soda solution, treated with animal charcoal, and the product precipitated by adjusting the pH to 3 with 2 N-hydrochloric acid. There is obtained 1-isopropyl-4-hydroxy-pyrazolo[3,4-d]pyrimidine in the form of white crystals of melting point 53° C.

7.3 grams of this product are heated to the boiling temperature for 5 hours with 40 cc. of phosphorus oxychloride. The phosphorus oxychloride is evaporated, the residue put into ice-water, the pH adjusted to 8 with 2 N-caustic soda solution, and the mixture extracted with ether. The ether is evaporated and the residue recrystallized from petroleum ether to obtain 1-isopropyl-4-chloropyrazolo [3,4-d]pyrimidine in the form of white crystals of melting point 53° C.

The 2-isopropyl-4-carbethoxy-3-amino-pyrazole used as starting material can be prepared as follows:

8.2 grams of isopropylhydrazine are introduced into a solution of 16.9 grams of ethoxymethylene cyanoacetic acid in 100 cc. of alcohol and heated at the boiling temperature for 12 hours. The mixture is then evaporated to dryness under reduced pressure and the reidue distilled in vacuo. 2-isopropyl-3-amino-4-carbethoxy-pyrazole passes over at 164–166° C. under a pressure of 10 mm. and solidifies in crystalline form in the receiver. The colorless crystals obtained melt between 46 and 48° C.

9 grams of 1-isopropyl-4-chloro-pyrazolo[3,4-d]pyrimidine and 50 cc. of liquid ammonia are heated at 100° C. for 5 hours in a sealed tube. After evaporation of the liquid ammonia there remains a white product which is extracted with methylene chloride. After evaporation of the latter the residue is recrystallized from cyclohexane. The resulting 1-isopropyl-4-amino-pyrazolo[3,4-d]pyrimidine forms white crystals of melting point 152–153° C.

A solution of 10 grams of 1-isopropyl-4-chloro-pyrazolo [3,4-d]pyrimidine in 250 cc. of toluene is mixed with 10 grams of furfurylamine and then heated to the boiling temperature for 10 hours. The mixture is then evaporated to dryness, the residue mixed with 100 cc. of 1 N-caustic soda solution, and the alkaline suspension extracted with chloroform. The chloroformic extract is recrystallized from much petroleum ether. There is obtained in this manner 1-isopropyl - 4 - furfurylamino-pyrazolo[3,4-d] pyrimidine of the formula

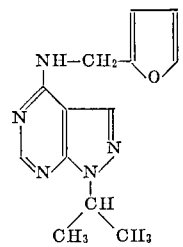

in the form of white crystals of melting point 140–141° C. By direct recrystallization of the chloroformic residue from alcoholic hydrochloric acid the hydrochloride of the above compound is obtained in the form of white crystals of melting point 183–184° C.

10 grams of 1- isopropyl - 4 - chloro-pyrazolo[3,4-d] pyrimidine and 50 cc. of liquid methylene are heated at 90–100° C. for 5 hours in a sealed tube. After evaporation of the liquid methylamine, the white residue is taken up in methylene chloride, and undissolved matter removed by filtration. The filtrate is evaporated and the residue crystallized from much petroleum ether. 1-isopropyl-4-methylamino-pyrazolo[3,4-d]pyrimidine is obtained in the form of white crystals of melting point 96–97° C.

EXAMPLE 21

10 grams of 1-isopropyl - 4:6 - dichloro-pyrazolo[3,4-d] pyrimidine and 70 cc. of liquid ammonia are heated in a sealed tube for 6 hours at 100° C. After evaporation of the liquid ammonia there remains a solid product which is extracted with 150 cc. of water to separate off the ammonium chloride. The product which is sparingly soluble in water can be recrystallized from methylene chloride. There is obtained 1-isopropyl-4-amino-6-chloro-pyrazolo[3,4-d]pyrimidine in the form of white crystals melting at 260–261° C.

In this compound, the chlorine atom may be exchange for amino groups by employing somewhat higher temperatures.

The 1-isopropyl - 4:6 - dichloro pyrazolo[3,4-d]pyrimidine may be obtained as follows:

10 grams of 2-isopropyl - 3 - amino-4-carbamyl-pyrazole and 20 grams of urea are mixed well and heated for one hour in a bath at 200° C. The hot melt is then poured into 150 cc. of 1 N-caustic soda solution, treated with animal charcoal and suction-filtered. The pH of the filtrate is adjusted to 3 with hydrochloric acid, whereupon white crystals separate. By recrystallizing the precipitate from water there is obtained 1-isopropyl-4:6-dihydroxy-pyrazolo[3,4-d]pyrimidine in the form of white crystals melting at 286–287° C. (with decomposition).

10 grams of 1-isopropyl - 4:6 - dihydroxy-pyrazolo [3,4-d]pyrimidine and 140 cc. of phosphorus oxychloride are heated together in a sealed tube for 15 hours at 160° C. A little undissolved matter is removed by filtration with suction. The phosphorus oxychloride is evaporated under reduced pressure, the residue is extracted with chloroform, the chloroformic solution is washed with water and the chloroformic residue crystallized from a very little petroleum ether. There is obtained 1-isopropyl-4:6-dichloro-pyrazolo[3,4-d]pyrimidine in the form of yellowish crystals melting at 67–68° C.

The starting material is prepared as follows:

30 grams of isopropyl-hydrazine are added to a solution of 48.8 grams of ethoxymethylene-malonitrile in 500 cc. of alcohol. The whole is then heated for 10 hours at the boil, evaporated to dryness under reduced pressure and crystallized from much isopropyl ether. There is obtained 2-isopropyl-3-amino - 4 - cyanopyrazole in the form of white crystals melting at 94–95° C. 10 grams of this compound are mixed with 200 cc. of 2 N-caustic soda solution and 100 cc. of alcohol, and the solution heated for 3 hours at the boil. The alcohol is evaporated under reduced pressure, the residue is allowed to cool and the precipitate filtered. The latter is recrystallized from alcohol. There is obtained 2-isopropyl-3-amino-4-carbamyl-pyrazole in the form of white crystals melting at 215–216° C.

EXAMPLE 22

10 grams of 1-sopropyl-4:6-dichloro-pyrazolo[3,4-d]pyrimidine and 70 cc. of liquid dimethylamine are heated for 5 hours at 100° C. in a sealed tube. After evaporation of the liquid dimethylamine a product remains which is recrystallized from petroleum ether. There is obtained 1 - isopropyl - 4:6 - bis-dimethylamino-pyrazolo[3,4-d]pyrimidine in the form of white crystals melting at 135–136° C. The compound forms a hydrochloride melting at 206–207° C.

EXAMPLE 23

A solution of 9 grams of 1-isopropyl - 4 - chloro-pyrazolo[3,4-d]pyrimidine and 8.5 grams of thiourea in 150 cc. of alcohol is heated for 12 hours at the boil. The mixture is evaporated to 70 cc. under reduced pressure and then allowed to cool. 1-isopropyl - 4 - mercapto-pyrazolo[3,4-d]pyrimidine soon precipitates in the form of yellow crystals melting at 207–208° C. It can be converted into 1 - isopropyl - 4 - n - propylamino-pyrazolo[3,4-d]pyrimidine as shown in Example 33.

EXAMPLE 24

155 grams of 1-isopropyl - 4 - chloro-pyrazolo[3,4-d]pyrimidine and 50 cc. of liquid dimethylamine are heated for 5 hours at 100° C. in a sealed tube. After evaporation of the dimethylamine, the residue is dissolved in water, the pH is adjusted to 9 with 1 N-caustic soda solution and the residue extracted with chloroform. After evaporation of the chloroform there crystallizes 1-isopropyl-4-dimethylamino - pyrazolo[3,4-d]pyrimidine in the form of white crystals melting at 69–70° C. The hydrochloride melts at 239–241° C.

EXAMPLE 25

18 grams of 1-isopropyl - 4 - chloro-pyrazolo[3,4-d]pyrimidine and 50 cc. of liquid diethylamine are heated for 5 hours at 90–100° C. in a sealed tube. After evaporation of the diethylamine, the residue is taken up in water and the aqueous solution extracted with ether. The etheral residue is a colorless oil. It is taken up in alcoholic hydrochloric acid. On evaporating the solution, the hydrochloride of 1 - isopropyl - 4 - diethylamino-pyrazolo[3,4-d]pyrimidine crystallizes in the form of white crystals melting at 165–167° C.

EXAMPLE 26

10 grams of 1-isopropyl-4:6-dichloro-pyrazolo[3,4-d]pyrimidine and 70 cc. of liquid monomethylamine are heated for 5 hours at 100° C. in a sealed tube. After evaporation of the liquid monomethylamine an oily residue remains in the tube which is taken up in benzene. The benzene residue is recrystallized from alcoholic hydrochloric acid. There is obtained the hydrochloride of 1 - isopropyl - 4:6 - bis - monomethylamine-pyrazolo[3,4-d]pyrimidine in the form of white crystals melting at 227–229° C.

EXAMPLE 27

10 grams of 1 - isopropyl-4:6-dichloro-pyrazolo[3,4-d]pyrimidine and 70 cc. of β-diethylamino-ethylamine are boiled under reflux for 3 hours. The excess β-diethylamino-ethylamine is distilled off in vacuo, the residue is taken up in 100 cc. of water, the pH adjusted to 9 with 2 N-caustic soda solution and the residue extracted with chloroform. The chloroformic residue is distilled at 210–225° C. under 0.2 mm. of pressure. There is obtained 1-isopropyl - 4:6 - bis - (β - diethylamino - ethylamino)-pyrazolo[3,4-d]pyrimidine in the form of a viscous oil.

EXAMPLE 28

18 grams of 1-isopropyl - 4 - chloro-pyrazol[3,4-d]pyrimidine and 50 cc. of n-propylamine are heated together in a closed tube for 5 hours to 120–130° C. The excess of propylamine is then evaporated off under vacuum and the residue taken up in chloroform and the solution washed with N-caustic soda solution. The chloroform residue is distilled, whereby 1-isopropyl - 4 - n - propylamino-pyrazolo[3,4-d]pyrimidine distills at 145–148° C. under 0.2 mm. pressure. The compound forms a hydrochloride of M.P. 172–173° C.

In a similar manner with isopropylamine 1-isopropyl-4-isopropylamino-pyrazolo[3,4-d]pyrimidine is obtained. The free base is crystalline and melts at 149–150° C. (hydrochloride: M.P. 188–190° C.).

EXAMPLE 29

18 grams of 1-isopropyl - 4 - chloro-pyrazolo[3,4-d]pyrimidine and 60 cc. of piperidine are heated in a closed tube for 3 hours to 120–130° C. The excess of piperidine is then distilled off under vacuum and the residue taken up in chloroform. The chloroform solution is extracted by shaking with N-sodium hydroxide solution and after evaporation of the chloroform the residue therefrom is distilled. 1 - isopropyl - 4 - piperidino-pyrazolo[3,4-d]pyrimidine passes over at 159–163° C. under 0.1 mm. pressure and crystallizes in the receiver to colorless crystals of M.P. 51–53° C. It forms a hydrochloride of M.P. 223–225° C.

In the same manner with morpholine 1-isopropyl-4-morpholino-pyrazolo[3,4-d]pyrimidine is obtained. It is a crystalline substance of M.P. 102–103° C.

EXAMPLE 30

In a closed tube 18 grams of 1-isopropyl-4-chloro-pyrazolo[3,4-d]pyrimidine and 50 cc. of di-n-butylamine are heated for 5 hours. The excess of dibutylamine is distilled off from the reaction mixture and the residue taken up in chloroform. After evaporation of the chloroform, 1 - isopropyl-4-(di-n-butylamino)-pyrazolo[3,4-d]pyrimidine distills at 150–152° C. under 0.2 mm. pressure.

In a similar manner, with di-n-amylamine, 1-isopropyl-4 - (di-n-amylamino)-pyrazolo[3,4-d]pyrimidine can be prepared. It is a colorless liquid of B.P. 165–167° C. under 0.25 mm. pressure.

EXAMPLE 31

18 grams of 1-isopropyl-4-chloro-pyrazolo[3,4-d] pyrimidine and 50 cc. of di-n-propylamine are heated in a closed tube for 5 hours to 120° C. The excess of di-n-propylamine is then evaporated off and the residue taken up in chloroform and the chloroform solution washed with water and N-sodium hydroxide solution and the chloroform evaporated off and the residue distilled. 1-isopropyl-4-(di-n-propylamino) - pyrazolo[3,4-d]pyrimidine passes over at 195–197° C. under 11 mm. pressure. The hydrochloride melts at 153–154° C.

EXAMPLE 32

A solution of 20 grams of N-methylpiperazine and 18 grams of 1-isopropyl-4-chloro-pyrazolo[3,4-d]pyrimidine in 150 cc. of acetone is heated for 4 hours in a closed tube to 110–120° C. The acetone and excess of methyl piperazine are evaporated off under vacuum and the residue treated with water, whereupon a white crystalline product is deposited which is separated by filtration. 1-isopropyl-4-(N - methyl - piperazino) - pyrazolo[3,4-d]pyrimidine melts at 63–65° C.

EXAMPLE 33

21 grams of 1-isopropyl-4-methyl-mercapto-pyrazolo[3,4-d]pyrimidine and 60 cc. of n-propylamine are heated together at 120–130° C. for 6 hours in a closed tube. Excess propylamine is evaporated off under reduced pressure, the residue is taken up in chloroform and the solution washed with 1 N-sodium hydroxide solution. The chloroform residue is distilled, 1-isopropyl-4-n-propylamino-pyrazolo[3,4-d]pyrimidine passing over at 146–148° C. under 0.2 mm. of pressure.

The 1-isopropyl-4-methyl - meracpto - pyrazolo[3,4-d] pyrimidine used as starting material can be prepared as follows:

1.5 grams of dimethylsulfate are added to 1.9 grams of 1-isopropyl-4-mercapto-pyrazolo[3,4-d]pyrimidine in 10 cc. of 1 N-sodium hydroxide solution with agitation. When the reaction is complete, the precipitated crystals are suction-filtered and recrystallized from petroleum ether. The resulting 1-isopropyl-4-methyl-mercapto-pyrazolo[3,4-d]pyrimidine melts at 41–42° C.

EXAMPLE 34

10 grams of 1-isopropyl-4:6-dichloro-pyrazolo[3,4-d] pyrimidine and 50 cc. of n-propylamine are heated together at 120–130° C. for 5 hours in a closed tube. The excess propylamine is then evaporated, the residue is taken up in chloroform and the solution washed with 1 N-sodium hydroxide solution. The chloroform residue is distilled, 1-isopropyl-4:6-di-n-propylamino - pyrazolo [3,4-d]pyrimidine of the formula

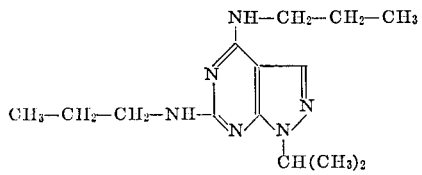

passing over at 178–180° C. under 0.2 mm. of pressure.

EXAMPLE 35

10 grams of 2-isopropyl-4-hydroxy - pyrazolo[3,4-d] pyrimidine and 15 grams of phosphorus pentasulfide are added to 100 cc. of pyridine and the whole is heated for 4 hours in a bath at 130° C. The hot pyridine solution is poured on to 1000 cc. of water, whereupon a brown precipitate separates on standing. The latter is dissolved in dilute sodium hydroxide solution, treated with animal charcoal, precipitated with the aid of dilute hydrochloric acid and after recrystallization from ethanol there is obtained 2-isopropyl-4-mercapto - pyrazolo[3,4-d]pyrimidine useful as intermediate in the preparation of 2-isopropyl-4-dimethylamino - pyrazolo[3,4-d]pyrimidine described in Examples 36 and 37. This intermediate of the formula

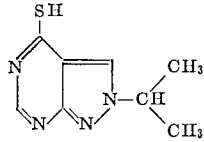

is obtained in the form of crystals melting at 237–239° C.

The 2-isopropyl-4-hydroxy - pyrazolo[3,4-d]pyrimidine used as starting material can be obtained as follows:

A solution of 11.6 grams of $N_1$-isopropyl-$N_2$-acetyl-hydrazine and 17 grams of ethoxymethylene-cyanacetic acid ester, in 250 cc. of ethanol is boiled for 12 hours under reflux. The ethanol is then evaporated in vacuo, 150 cc. of 8 N-alcoholic hydrochloric acid are added to the oily residue containing β-($N_2$-acetyl-$N_1$-isopropyl-hydrazino)-α-cyano-acrylic acid ethyl ester, and the whole is boiled under reflux for 2 hours. The mixture is again evaporated in vacuo, the residue is taken up in 2 N-aqueous hydrochloric acid, the solution is filtered to remove undissolved material, and its pH value is adjusted to 8 to 9 with caustic soda solution. The mixture is then extracted with chloroform and the residue obtained by evaporating chloroform is recrystallized from cyclo-hexane. There is obtained 1-isopropyl-3-amino-4-carbethoxy-pyrazole of the formula

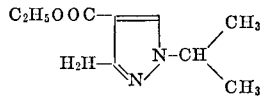

in the form of white crystals melting at 72–73° C.

19.7 grams of 1-isopropyl - 3 - amino - 4 - carbethoxy-pyrazole are heated in 50 cc. of formamide for 5 hours in a bath having a temperature of 200–210° C. After cooling, the crystalline precipitate is suction-filtered and crystallized from boiling ethyl alcohol for the purpose of purification. 2 - isopropyl - 4 - hydroxy - pyrazolo[3,4-d] pyrimidine of the formula

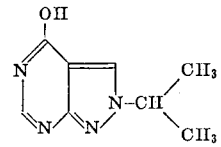

is obtained in the form of crystals melting at 229–230° C.

EXAMPLE 36

19.4 grams of 2-isopropyl-4-mercapto-pyrazolo[3,4-d] pyrimidine are mixed with 150 cc. of 1 N-sodium hydroxide solution. 16 grams of dimethyl sulfate are slowly added to the solution with stirring and the whole is then stirred for 30 minutes at room temperature. The precipitate is suction-filtered and crystallized from ethanol. 2-isopropyl - 4 - thiono-5-methyl-4:5-dihydro-pyrazolo[3,4-d] pyrimidine of the formula

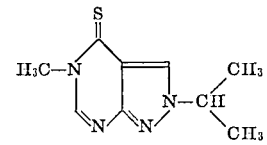

is obtained in the form of crystals melting at 178–180° C.

The alkaline aqueous filtrate is then extracted with much chloroform and, after evaporating the chloroform, yellow crystals are obtained as residue which are recrystallized from a little isopropyl ether. 2-isopropyl-4-methyl-mercapto-pyrazolo[3,4-d]pyrimidine of the formula

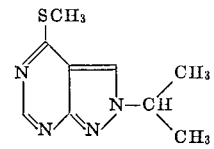

is obtained in the form of white crystals melting at 78–79° C. It can be converted into 2-isopropyl-4-dimethylamino-pyrazolo[3,4-d]pyrimidine as described in the following example.

EXAMPLE 37

10 grams of 2-isopropyl-4-methyl-mercapto-pyrazolo-[3,4-d]pyrimidine are heated together with 40 cc. of liquid dimethylamine in a closed tube for 6 hours at 90–100° C. After evaporating the excess dimethylamine, the residue is mixed with a very little water and expelled with 10 N-sodium hydroxide solution. The precipitated oil is taken up in chloroform. The chloroform residue is recrystallized from much isopropyl ether. 2-isopropyl-4-dimethylamino-pyrazolo[3,4-d]pyrimidine is obtained in the form of white crystals melting at 138–140° C.

EXAMPLE 38

8.5 grams of 2-isopropyl-4-methyl-mercapto-pyrazolo-[3,4-d]pyrimidine are heated together with 80 cc. of liquid ammonia in an autoclave for 20 hours at 95–100° C. The residue is dissolved in 20 cc. of 1 N-hydrochloric acid, a little undissolved material is suction-filtered, and the filtrate is treated with 10 N-sodium hydroxide solution, a solid precipitate separating. The latter is crystallized from a mixture of ethanol and ether, and 2-isopropyl-4-aminopyrazolo[3,4-d]pyrimidine is obtained in the form of white crystals melting at 236–237° C.

EXAMPLE 39

5 grams of 1-methyl-3-amino-4-carbethoxy-pyrazole are heated with 15 cc. of formamide for 10 hours at 190° C. After cooling to room temperature the precipitate is filtered and recrystallized from water. 2-methyl-4-hydroxy-pyrazolo[3,4-d]pyrimidine of the formula

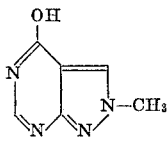

is obtained in the form of whitecrystals melting at 193° C.

10 grams of 2-methyl-4-hydroxy-pyrazolo[3,4-d]pyrimidine are heated with 80 grams of phosphorus pentasulfide in 200 cc. of pyridine for 6 hours at 115° C. The pyridine is removed under reduced pressure. 300 cc. of water are added cautiously to the mixture. A grey precipitate is formed which is filtered and dissolved in 2 N-sodium hy-droxide solution. By adding 2 N-hydrochloric acid, 2-methyl-4-mercapto-pyrazolo[3,4-d]pyrimidine of the formula

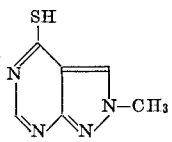

precipitates. The melting point of this compound lies above 350° C.

The starting material may be prepared as follows:

A solution of 65 grams of $N_1$-methyl-$N_2$-benzylidenehydrazine and 85 grams of ethoxymethylene-cyanoacetic acid ester in 500 cc. of benzene is boiled under reflux for 10 hours. There is formed a precipitate which is filtered off and recrystallized from ethanol. There is obtained β-($N_2$-benzylidene-$N_1$-methyl-hydrazino)-α-cyano - acrylic acid ethyl ester in the form of slightly yellow crystals melting at 155–156° C.

80 grams of β-($N_2$-benzylidene-$N_1$-methyl-hydrazino)-α-cyano-acrylic acid ethyl ester are boiled under reflux for 2 hours with 10 N-alcoholic hydrochloric acid. The solvent is then removed by distillation in vacuo. The residue is taken up in 200 cc. of 2 N-hydrochloric acid and the acid solution is extracted by agitation with ether. After separating the aqueous layer, the latter is rendered alkaline by the addition of 2 N-solution of caustic soda. The precipitated base is extracted by repeated agitation with ether. The ethereal extract is separated, dried, the ether is evaporated, and the residue is distilled at 130° C. under 0.01 mm. pressure. The resulting 1-methyl-3-amino-4-carbethoxy-pyrazole of the formula

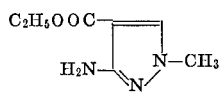

melts at 92–93° C.

EXAMPLE 40

9 grams of dimethyl sulfate are added to a solution of 10 grams of 2-methyl-4-mercaptopyrazolo[3,4-d]pyrimidine in 40 cc. of 2 N-sodium hydroxide solution with stirring at room temperature. After one hour the precipitate formed is filtered and recrystallized from ethanol, There is obtained 2-methyl-4-methylmercapto-pyrazolo [3,4-d]pyrimidine of the formula

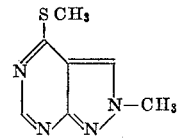

melting at 172–173° C.

EXAMPLE 41

A solution of 10 grams of 2-methyl-4-methylmercapto-pyrazolo[3,4-d]pyrimidine and 10 grams of propylamine in 100 cc. of ethanol are heated for 6 hours at the boil. The precipitated 2:5-dimethyl-4-thiono-4:5-dihydro-pyrazolo[3,4-d]pyrimidine of the formula

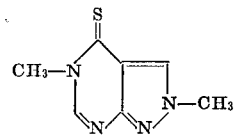

is filtered and sublimed in high vacuum for the purpose of purification. Melting point 263–265° C.

The filtrate is evaporated. The residue is crystallized from a mixture of methylene chloride and petroleum ether and 2 - methyl - 4-propylamino-pyrazolo[3,4-d]pyrimidine of the formula

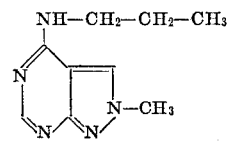

is obtained in the form of crystals melting at 133° C. The hydrochloride melts at 244–246° C.

EXAMPLE 42

15 grams of 1-methyl-3-amino-4-cyanopyrazole are heated with 10 cc. of formamide for 10 hours. The precipitate is filtered and recrystallized from water. 2-methyl-4-amino-pyrazolo[3,4-]pyrimidine of the formula

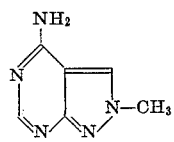

is obtained. The compound melts above 350° C.

The starting material can be obtained as follows: To a solution of 122 grams of ethoxy-methylene-malonitrile in 150 cc. of benzene there are added 134 grams of $N_1$-methyl-$N_2$-benzylidene-hydrazine. After being allowed to stand for a short time at room temperature, a precipitate is formed which is filtered and recrystallized from ethanol. There is obtained β-($N_2$-benzylidene-$N_1$-methyl-hydrazino)-α-cyano-acrylic acid nitrile in crystals melting at 218° C.

50 grams of β-($N_2$-benzylidene-$N_1$-methyl-hydrazino)-α-cyano-acrylic acid nitrile are boiled under reflux with 30 cc. of concentrated hydrochloric acid in 400 cc. of ethanol for 30 minutes. After evaporating the solvent in vacuo, 200 cc. of ether are added to the residue and the crystalline precipitate is filtered. 50 cc. of 10 N-sodium hydroxide solution are then added to the latter and it is then extracted several times with chloroform. After drying and evaporating the chloroform extract, the residue is recrystallized from methylene chloride-petroleum ether.

There is obtained 1-methyl-3-amino-4-cyano-pyrazole of the formula

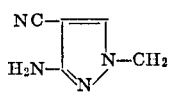

in the form of crystals melting at 135–136° C.

We claim:

1. A member selected from the group consisting of a compound of the formulae

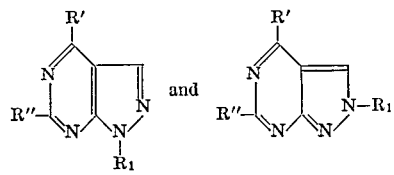

wherein $R_1$ stands for a member selected from the group consisting of lower branched alkyl and cyclo-lower alkyl of at least 3 carbon atoms and hydroxy-lower alkyl, R' is a member selected from the group consisting of free and lower alkyl mercapto groups, and R" is a member selected from the group consisting of hydrogen, halogen, lower alkyl and R'.

2. A compound as claimed in claim 1, which compound is the 1-secondary butyl-4-mercapto-pyrazolo[3,4-d]pyrimidine.

3. A compound as claimed in claim 1, which compound is the 1 - secondary butyl-4-methylmercapto-pyrazolo [3,4-d]pyrimidine.

4. A compound as claimed in claim 1, which compound is the 1-isopropyl-4-mercapto-pyrazolo[3,4-d]pyrimidine.

5. A compound as claimed in claim 1, which compound is the 1-isopropyl-4-methylmercapto-pyrazolo[3,4-d]pyrimidine.

6. A compound as claimed in claim 1, which compound is the 2-isopropyl-4-mercapto-pyrazolo[3,4-d]pyrimidine.

7. A compound as claimed in claim 1, which compound is the 2-isopropyl-4-methylmercapto-pyrazolo[3,4-d]pyrimidine.

8. The 2,5 - dimethyl - 4-thiono-4,5-dihydro-pyrazolo [3,4-d]pyrimidine.

9. The 2-methyl-4-mercapto-pyrazolo[3,4-d]pyrimidine.

10. The 2-methyl-4-methylmercapto-pyrazolo[3,4-d]pyrimidine.

References Cited

Cheng et al., J. Org, Chem., 21, 1240, 1242, 1248, 1249, 1251–6 (1956).

ALEX MAZEL, Primary Examiner

R. J. GALLAGHER, Assistant Examiner